US012039322B2

(12) United States Patent
Ishikawa et al.

(10) Patent No.: US 12,039,322 B2
(45) Date of Patent: Jul. 16, 2024

(54) OTA MASTER, CENTER, SYSTEM, UPDATE METHOD, NON-TRANSITORY STORAGE MEDIUM, AND VEHICLE

(71) Applicant: TOYOTA JIDOSHA KABUSHIKI KAISHA, Toyota (JP)

(72) Inventors: Tomoyasu Ishikawa, Nagoya (JP); Shunsuke Tanimori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 56 days.

(21) Appl. No.: 17/658,453

(22) Filed: Apr. 8, 2022

(65) Prior Publication Data

US 2022/0342653 A1    Oct. 27, 2022

(30) Foreign Application Priority Data

Apr. 26, 2021    (JP) ................... 2021-073967

(51) Int. Cl.
*G06F 8/654*    (2018.01)
*G06F 8/65*    (2018.01)
(Continued)

(52) U.S. Cl.
CPC ............... *G06F 8/654* (2018.02); *G06F 8/65* (2013.01); *G07C 5/008* (2013.01); *G07C 5/0841* (2013.01); *H04L 67/12* (2013.01)

(58) Field of Classification Search
CPC ... G06F 8/60–66; G07C 5/008; G07C 5/0841; H04W 8/245; H04W 4/40; H04L 67/06; H04L 67/12; H04L 67/34

(Continued)

(56) References Cited

U.S. PATENT DOCUMENTS

2017/0300313 A1* 10/2017 Gantt, Jr. ................ H04L 67/12
2020/0050378 A1* 2/2020 Sakurai ................... G06F 8/654

FOREIGN PATENT DOCUMENTS

CN    112567333 A    3/2021
DE    102015116703 A1 * 4/2016 ............ G06F 8/654
(Continued)

OTHER PUBLICATIONS

Over-the-air programming, Wikipedia, 2019, 4 pages, [retrieved on Sep. 6, 2023], Retrieved from the Internet: <URL:https://web.archive.org/web/20190626211348/https://en.wikipedia.org/wiki/Over-the-air_programming>.*

(Continued)

*Primary Examiner* — Geoffrey R St Leger
(74) *Attorney, Agent, or Firm* — Oblon, McClelland, Maier & Neustadt, L.L.P.

(57) ABSTRACT

An OTA master includes one or more processors configured to control software update for a plurality of electronic control units mounted on a vehicle, the electronic control units including a first electronic control unit on which a first type non-volatile memory including one storage area is mounted and a second electronic control unit on which a second type non-volatile memory including two storage areas is mounted; receive, from a center, first update data for the first electronic control unit and second update data for the second electronic control unit; write the second update data on the second electronic control unit after completing reception of the first update data and the second update data; and write the first update data on the first electronic control unit at a predetermined timing.

10 Claims, 8 Drawing Sheets

(51) Int. Cl.
  *G07C 5/00* (2006.01)
  *G07C 5/08* (2006.01)
  *H04L 67/12* (2022.01)

(58) Field of Classification Search
  USPC .................................................. 717/168–178
  See application file for complete search history.

(56) References Cited

FOREIGN PATENT DOCUMENTS

| | | | |
|---|---|---|---|
| JP | 2001-60906 A | 3/2001 | |
| JP | 2004-326689 A | 11/2004 | |
| JP | 2020-27628 A | 2/2020 | |
| WO | WO-2020170407 A1 * | 8/2020 | .............. B41J 11/48 |

OTHER PUBLICATIONS

U.S. Appl. No. 17/657,846, filed Apr. 4, 2022, Ishikawa.

\* cited by examiner

| ECU ID | MEMORY TYPE |
|---|---|
| aaaa | SECOND TYPE (DUAL BANK) |
| bbbb | SECOND TYPE (DUAL BANK) |
| cccc | FIRST TYPE (SINGLE BANK) |
| dddd | FIRST TYPE (SINGLE BANK) |
| ... | ... |

OTA MASTER, CENTER, SYSTEM, UPDATE METHOD, NON-TRANSITORY STORAGE MEDIUM, AND VEHICLE

CROSS-REFERENCE TO RELATED APPLICATION

This application claims priority to Japanese Patent Application No. 2021-073967 filed on Apr. 26, 2021, incorporated herein by reference in its entirety.

BACKGROUND

1. Technical Field

The present disclosure relates to an OTA master, a center, a system, an update method, a non-transitory storage medium, and a vehicle.

2. Description of Related Art

A plurality of electronic control units (ECUs) used for controlling an operation of a vehicle is mounted on a vehicle. The ECU includes a processor, a non-transitory storage unit, such as a random access memory (RAM), and a non-volatile memory which is a non-volatile storage unit, such as a flash read-only memory (ROM). A control function of the ECU is implemented when the processor executes software stored in the non-volatile memory. Software stored in each ECU is rewritable, and by updating to a newer version of the software, it is possible to improve a function of each ECU or add a new vehicle control function.

As a technology for updating software of an ECU, an over-the-air (OTA) technology is well-known. In the OTA technology, a device that wirelessly connects an in-vehicle communication device connected to an in-vehicle network to a communication network, such as the Internet, and executes software update processing of the vehicle updates or adds the software of the ECU by downloading software from a server via wireless communication and installing the downloaded software on the ECU (see, for example, Japanese Unexamined Patent Application Publication No. 2004-326689.)

As types of non-volatile memories mounted on the ECU, there are a memory (hereinafter, referred to as a single-bank memory) having one storage area used for storing data, such as software, and a memory (hereinafter, referred to as a dual-bank memory) having two storage areas used for storing data, such as software. The non-volatile memories may be properly used according to specifications or the like of the ECU. An ECU having the dual-bank memory mounted thereon can store two versions of data, old and new, in the two storage areas, respectively.

SUMMARY

Some control functions, such as autonomous driving, provided in a vehicle are implemented by a cooperative operation between a plurality of ECUs (or actuators). Further, the plurality of ECUs that are required to operate cooperatively may include both an ECU having a single-bank memory mounted thereon and an ECU having a dual-bank memory mounted thereon. In this case, in order to execute the autonomous driving function, it is required that control functions of pieces of software of the plurality of ECUs that implements the autonomous driving are consistent with each other. For this reason, for example, when the software update processing is delayed in some of the plurality of ECUs that are required to operate cooperatively, a limitation that the autonomous driving function cannot be executed during that period occurs.

For this reason, in a campaign, which is an event for software updating for vehicles, when applying, to a vehicle, a campaign in which an ECU having a single-bank memory mounted thereon and an ECU having a dual-bank memory mounted thereon are mixed as ECUs to be updated, unless download, installation, activation, and the like are appropriately executed according to structures of the memories of the ECUs to be updated, a time during which a function and the like that require cooperative operation by the plurality of ECUs is limited may be lengthened.

The present disclosure provides an OTA master, a center, a system, an update method, a non-transitory storage medium, and a vehicle capable of executing software update adapted to each ECU having a single-bank memory mounted thereon and an ECU having a dual-bank memory mounted thereon.

An OTA master according to a first aspect of the present disclosure includes one or more processors configured to: control software update for a plurality of electronic control units mounted on a vehicle, the electronic control units including a first electronic control unit on which a first type non-volatile memory having one storage area is mounted and a second electronic control unit on which a second type non-volatile memory having two storage areas is mounted; receive, from a center, first update data for the first electronic control unit and second update data for the second electronic control unit; write the second update data on the second electronic control unit after completing reception of the first update data and the second update data; and write the first update data on the first electronic control unit is mounted at a predetermined timing.

A center according to a second aspect of the present disclosure includes one or more processors configured to: communicate with an OTA master configured to control software update for a plurality of electronic control units mounted on a vehicle, the electronic control unit including a first electronic control unit on which a first type non-volatile memory having one storage area is mounted and a second electronic control unit on which a second type non-volatile memory having two storage areas is mounted; transmit, to the OTA master, first update data for the electronic control unit and second update data for the second electronic control unit; and give, to the OTA master, an instruction on a timing of writing the first update data on the first electronic control unit.

A system according to a third aspect of the present disclosure includes: a center including one or more first processors; and an OTA master including one or more second processors. The one or more first processors are configured to communicate with the one or more second processors configured to control software update for a plurality of electronic control units mounted on a vehicle, the electronic control unit including a first electronic control unit on which a first type non-volatile memory having one storage area is mounted and a second electronic control unit on which a second type non-volatile memory having two storage areas is mounted, transmit, to the OTA master, first update data for the first electronic control unit and second update data for the second electronic control unit, and give, to the OTA master, an instruction on a timing of writing the first update data on the first electronic control unit. The one or more second processors are configured to receive, from the center, the first update data and the second update data, write the second update data on the second electronic control unit after completing reception of the first update data and the second update data, and write the first update data on the first electronic control unit at a timing instructed by the one or more first processors.

An update method according to a fourth aspect of the present disclosure is executed by an OTA master that includes one or more processors and a memory, and is configured to control software update for a plurality of electronic control units mounted on a vehicle. The update method includes: receiving, from a center, first update data for a first electronic control unit on which a first type non-volatile memory having one storage area is mounted and second update data for a second electronic control unit on which a second type non-volatile memory having two storage areas is mounted, the first electronic control unit and the second electronic control unit being included in the electronic control units; writing the second update data on the second electronic control unit after completing reception of the first update data and the second update data; and writing the first update data on the first electronic control unit at a predetermined timing.

A non-transitory storage medium according to a fifth aspect of the present disclosure stores instructions that are executable by a computer of an OTA master which includes one or more processors and a memory, and is configured to control software update for a plurality of electronic control units mounted on a vehicle, and that cause the computer to execute the update method according to the fourth aspect.

A vehicle according to a sixth aspect of the present disclosure includes the OTA master according to the first aspect.

With each aspect of the present disclosure, it is possible to provide an OTA master a center, a system, an update method, a non-transitory storage medium, and a vehicle capable of executing software update adapted to an electronic control unit on which a single-bank memory is mounted and an electronic control unit on which a dual-bank memory is mounted, respectively.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In a network system used for updating software of an ECU of the present disclosure, an OTA master receives, from a center, update data for an ECU having a single-bank memory mounted thereon and update data for an ECU having a dual-bank memory mounted thereon. Then, the OTA master executes installation of the update data on the ECU having the dual-bank memory mounted thereon after receiving the update data, and executes installation of the update data on the ECU having the single-bank memory mounted thereon at a predetermined timing. As such, it is possible to avoid a case where the installation of the ECU having the dual-bank memory mounted thereon fails and the installation of the ECU having the single-bank memory mounted thereon succeeds, and thus it is possible to execute software update adapted to each of the ECUs having memories mounted thereon respectively. Hereinbelow, one embodiment of the present disclosure will be described in detail with reference to drawings.

Embodiments

System Configuration

Figure 1:
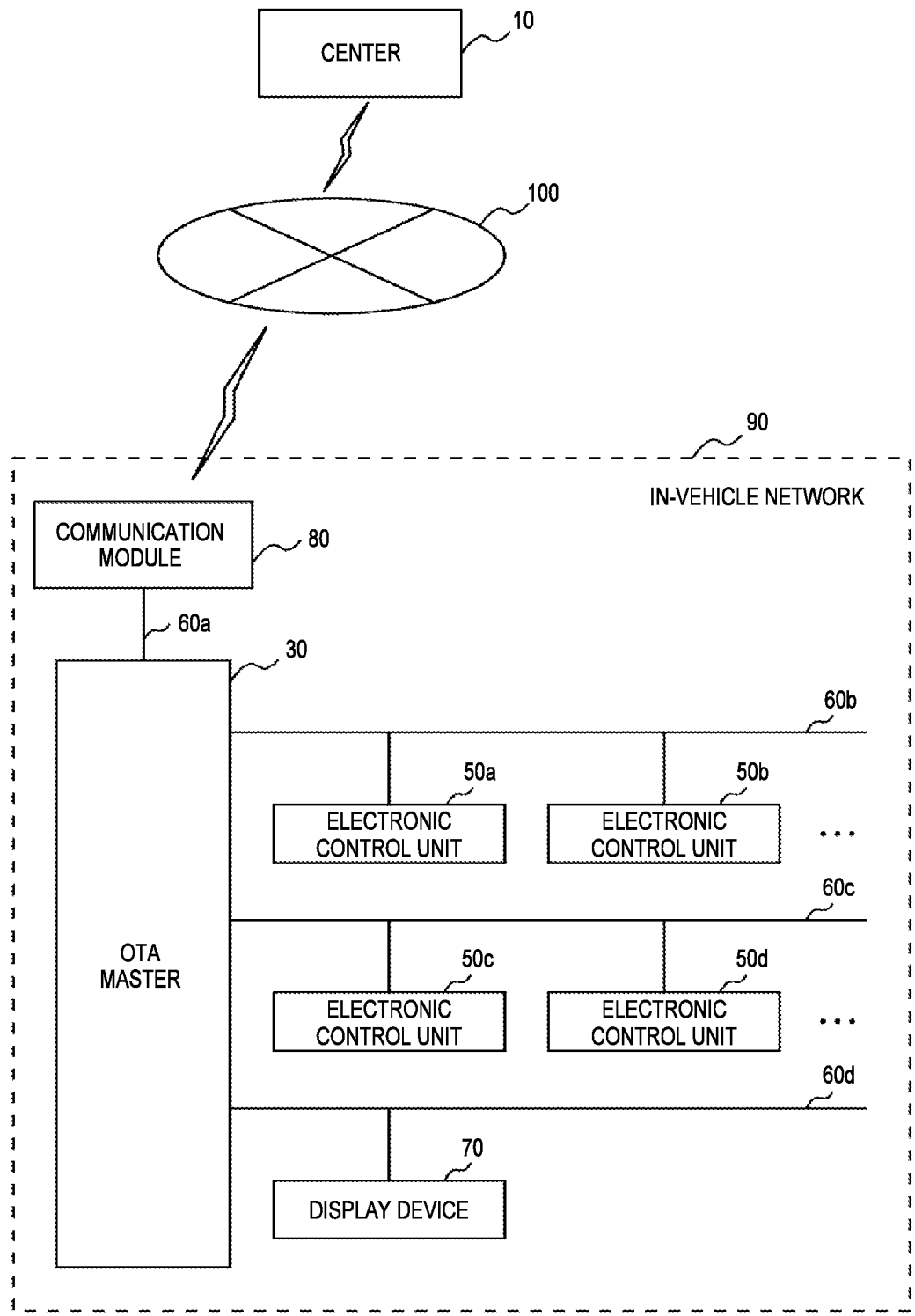
FIG. 1 is a block diagram illustrating an overall configuration of a network system according to an embodiment.

FIG. 1 is a block diagram illustrating an overall configuration of a network system according to an embodiment of the present disclosure. The network system illustrated in FIG. 1 is used for updating pieces of software of a plurality of ECUs 50a to 50d mounted on a vehicle, and includes a center 10 outside the vehicle and an in-vehicle network 90 constructed inside the vehicle.

(1) Center

The center 10 can communicate with an OTA master 30, described below and included in the in-vehicle network 90 via a network 100, and can control and manage update data of the pieces of the software of the ECUs 50a to 50d connected to the OTA master 30 by executing transmission of the update data of the pieces of the software of the ECUs 50a to 50d, reception of a notification indicating a proceeding situation of software update processing, or the like. The center 10 functions as a so-called server.

Figure 2:
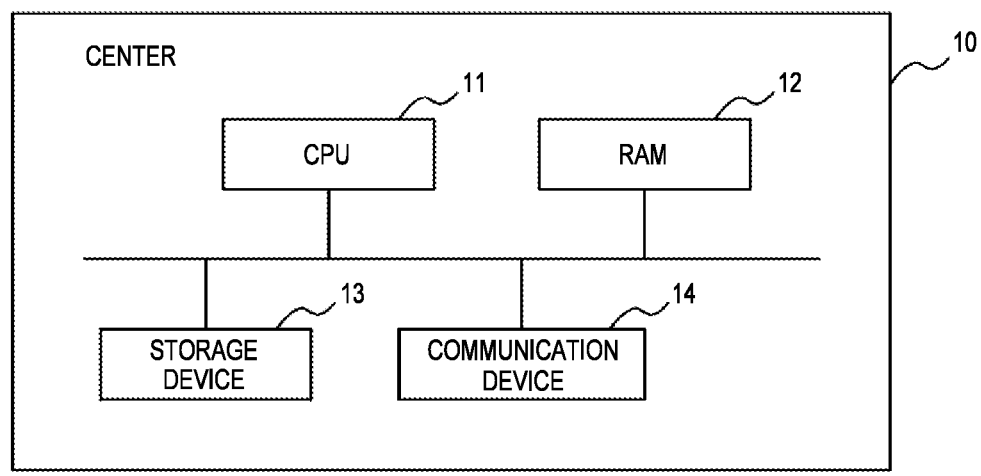
FIG. 2 is a block diagram illustrating a schematic configuration of a center.

FIG. 2 is a block diagram illustrating a schematic configuration of the center 10 in FIG. 1. As illustrated in FIG. 2, the center 10 includes one or more central processing units (CPUs) 11, a RAM 12, a storage device 13, and a communication device 14. The storage device 13 includes a readable and writable storage medium, such as a hard disk drive (HDD) or a solid-state drive (SSD), and stores a program used for executing software update management, information used for software update control and the update management, the update data of a piece of the software of each ECU, and the like. At the center 10, the CPU 11 executes predetermined processing for software update by executing a program read from the storage device 13 using the RAM 12 as a work area. The communication device 14 is used for communicating with the OTA master 30 via the network 100.

Figure 3:
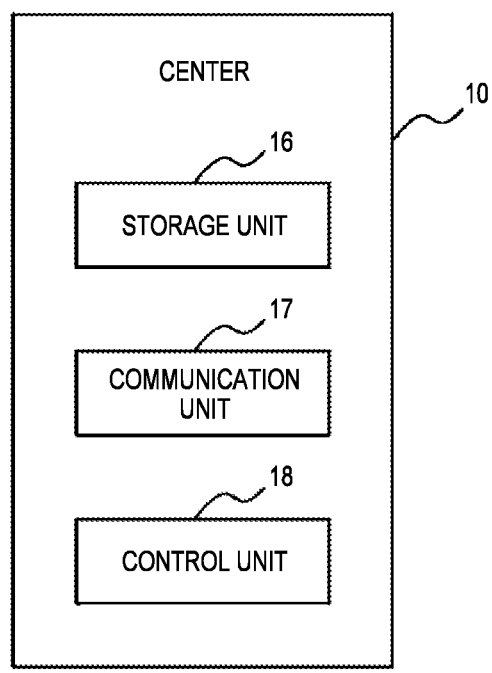
FIG. 3 is a functional block diagram of the center.

FIG. 3 is a functional block diagram of the center 10 illustrated in FIG. 2. The center 10 illustrated in FIG. 3 includes a storage unit 16, a communication unit 17, and a control unit 18. A function of the storage unit 16 is implemented by the storage device 13 illustrated in FIG. 2. Functions of the communication unit 17 and the control unit 18 are implemented when the CPU 11 illustrated in FIG. 2 executes a program stored in the storage device 13 using the RAM 12.

The storage unit 16 stores information on the software update processing of one or more ECUs mounted on the vehicle. As the information on the software update processing, the storage unit 16 stores at least update management information in which information indicating software that can be used in the ECUs 50a to 50d is associated with each piece of vehicle identification information (a vehicle ID) that identifies a vehicle, and the update data of the pieces of the software of the ECUs 50a to 50d. As the information indicating the software that can be used by the ECUs 50a to 50d, for example, a combination of latest version information of the software of the ECUs 50a to 50d is defined. Further, as the information on the software update processing, the storage unit 16 can store an update status indicating an update state of the software executed in the vehicle.

The communication unit 17 functions as a transmission unit and a receiving unit that transmits and receives data, information, requests, and the like, to and from the OTA master 30. The communication unit 17 receives an update confirmation request of the software from the OTA master 30 (the receiving unit). The update confirmation request may be, for example, information transmitted from the OTA master 30 to the center 10 at a time when a power supply or an ignition is turned on (hereinafter, referred to as "power supply ON") in the vehicle, and is information for requesting the center 10 to confirm whether the update data for the ECUs 50a to 50d exists based on vehicle configuration information described below. Further, the communication unit 17 transmits information indicating whether the update data exists to the OTA master 30 in response to the update confirmation request received from the OTA master 30 (the transmission unit). Further, the communication unit 17 receives a transmission request (a download request) for the distribution package from the OTA master 30 (the receiving unit). Further, upon receiving the download request for the distribution package, the communication unit 17 transmits, to the OTA master 30, a distribution package containing the update data of the pieces of the software of the ECUs 50a to 50d generated by the control unit 18 described below.

When the communication unit 17 receives the update confirmation request from the OTA master 30, the control unit 18 determines, based on the update management information stored in the storage unit 16, whether the update data of the pieces of software of the ECUs 50a to 50d mounted on the vehicle specified by the vehicle ID, which is included in the update confirmation request, exists. The determination result, by the control unit 18, of whether the update data exists is transmitted to the OTA master 30 by the communication unit 17. Upon determining that the update data of the pieces of the software of the ECUs 50a to 50d exists, the control unit 18 generates the distribution package containing the update data stored in the storage unit 16 when receiving the download request for the distribution package from the OTA master 30. The control unit 18 may individually generate a distribution package containing only the update data for the ECU having the single-bank memory, described below, mounted thereon and a distribution package containing only the update data for the ECU having the dual-bank memory, described below, mounted thereon. Alternatively, the control unit 18 may generate a distribution package containing the update data for the ECU having the single-bank memory mounted thereon and the update data for the ECU having the dual-bank memory mounted thereon.

(2) In-Vehicle Network

The in-vehicle network 90 includes the OTA master 30, the ECUs 50a to 50d, a display device 70, and a communication module 80. The OTA master 30 is connected to the communication module 80 via a bus 60a, connected to the ECUs 50a, 50b via a bus 60b, and connected to the ECUs 50c, 50d via a bus 60c. The OTA master 30 is connected to the display device 70 via a bus 60d.

The OTA master 30 can communicate with the center 10 via the bus 60a and the communication module 80 by way of the network 100 in a wireless manner. Further, the OTA master 30 can communicate with the ECUs 50a to 50d and the display device 70 via the buses 60b to 60d in a wired manner. The OTA master 30 has functions of managing an OTA state and executing the software update for an ECU to be updated (hereinafter, also referred to as a "target ECU") by controlling the update sequence, which is a flow of the software update processing. The OTA master 30 controls the software update for the target ECU from among the ECUs 50a to 50d based on the update data and the like that are acquired from the center 10. The OTA master 30 may also be referred to as a central gateway (CGW).

Figure 4:
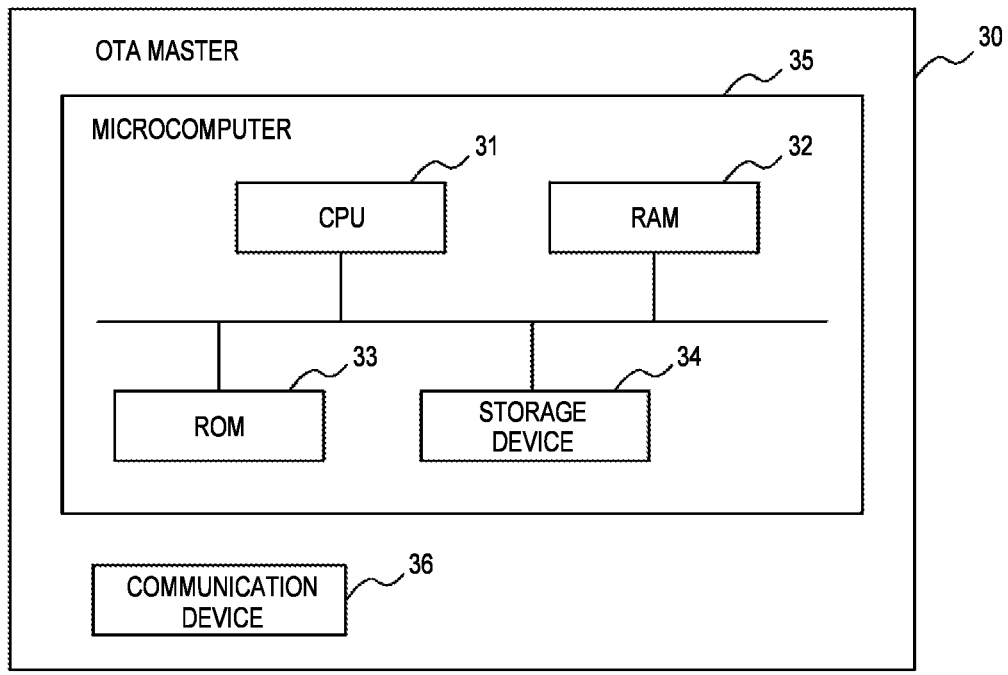
FIG. 4 is a block diagram illustrating a schematic configuration of an OTA master.

FIG. 4 is a block diagram illustrating a schematic configuration of the OTA master 30 in FIG. 1. As illustrated in FIG. 4, the OTA master 30 includes one or more CPUs 31, a RAM 32, a ROM 33, a storage device 34, and a communication device 36. The CPU 31, the RAM 32, the ROM 33, and the storage device 34 compose a microcomputer 35. In the OTA master 30, the CPU 31 executes predetermined processing for the software update by executing a program read from the ROM 33 using the RAM 32 as a work area. The communication device 36 is used for communicating with each of the communication module 80, the ECUs 50a to 50d, and the display device 70 via the buses 60a to 60d illustrated in FIG. 1.

Figure 5:
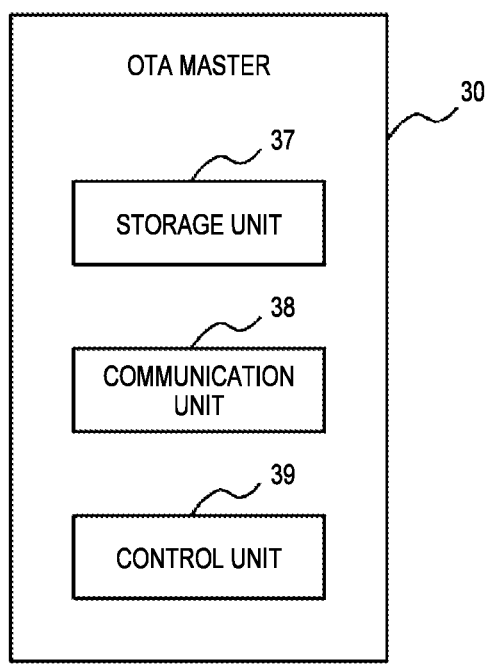
FIG. 5 is a functional block diagram of the OTA master.

FIG. 5 is a functional block diagram of the OTA master 30 illustrated in FIG. 4. The OTA master 30 illustrated in FIG. 5 includes a storage unit 37, a communication unit 38, and a control unit 39. A function of the storage unit 37 is implemented by the storage device 34 illustrated in FIG. 4. Functions of the communication unit 38 and the control unit 39 are implemented when the CPU 31 illustrated in FIG. 4 executes a program stored in the ROM 33 using the RAM 32.

In addition to a program (a control program of the OTA master 30) for updating the pieces of the software of the ECUs 50a to 50d or various pieces of data used when updating the pieces of the software, the storage unit 37 stores the software update data and the like that are downloaded from the center 10. Further, the storage unit 37 stores the information (described below) on the types of the non-volatile memories mounted on the ECUs 50a to 50d, respectively.

The communication unit 38 functions as a transmission unit and receiving unit that transmits and receives data, information, requests, and the like to and from the center 10. The communication unit 38 transmits the update confirmation request of the software to the center 10 at, for example, the time of power supply ON in the vehicle (the transmission unit). The update confirmation request includes, for example, a vehicle ID for identifying the vehicle and the information on the current versions of the pieces of the software of the ECUs 50a to 50d connected to the in-vehicle network 90. The vehicle ID and the current versions of the pieces of the software of the ECUs 50a to 50d are used for determining whether the update data of the pieces of the software of the ECUs 50*a* to 50*d* exists by comparing them with the latest software version held by the center 10 for each vehicle ID. Further, as a response to the update confirmation request, the communication unit 38 receives, from the center 10, a notification indicating whether the update data exists (the receiving unit). When the update data of the pieces of the software of the ECUs 50*a* to 50*d* exists, the communication unit 38 transmits, to the center 10, the download request for the distribution package containing the update data and the like of the software (the transmission unit), and receives (downloads) the distribution package transmitted from the center 10 (the receiving unit). Further, the communication unit 38 transmits, to the center 10, the update state of the software transmitted by the ECUs 50*a* to 50*d* (the transmission unit).

The control unit 39 determines whether the update data of the pieces of the software of the ECUs 50*a* to 50*d* exists based on the response to the update confirmation request received by the communication unit 38 from the center 10. Further, the control unit 39 verifies authenticity of the distribution package received (downloaded) by the communication unit 38 from the center 10 and stored in the storage unit 37. Further, the control unit 39 controls the software update processing (various types of verification, the installation, the activation, and the like) for the ECUs 50*a* to 50*d*, using the update data received (downloaded) from the center 10. Specifically, the control unit 39 transfers one or more pieces of update data downloaded in the distribution package to the target ECU and causes the target ECU to install the update software based on the update data. After the completion of the installation, the control unit 39 gives the target ECU an instruction on activation that makes the installed update software active.

The ECUs 50*a* to 50*d* are devices used for controlling the operation of each part of the vehicle. In FIG. 1, an example where the in-vehicle network 90 includes four ECUs 50*a* to 50*d* is illustrated, but the number of ECUs is not particularly limited. Further, the number of buses connecting the ECUs 50*a* to 50*d* to the OTA master 30 is not particularly limited, either. Examples of schematic configurations of the ECUs 50*a* to 50*d* are illustrated in FIGS. 6A and 6B.

Figure 6A:
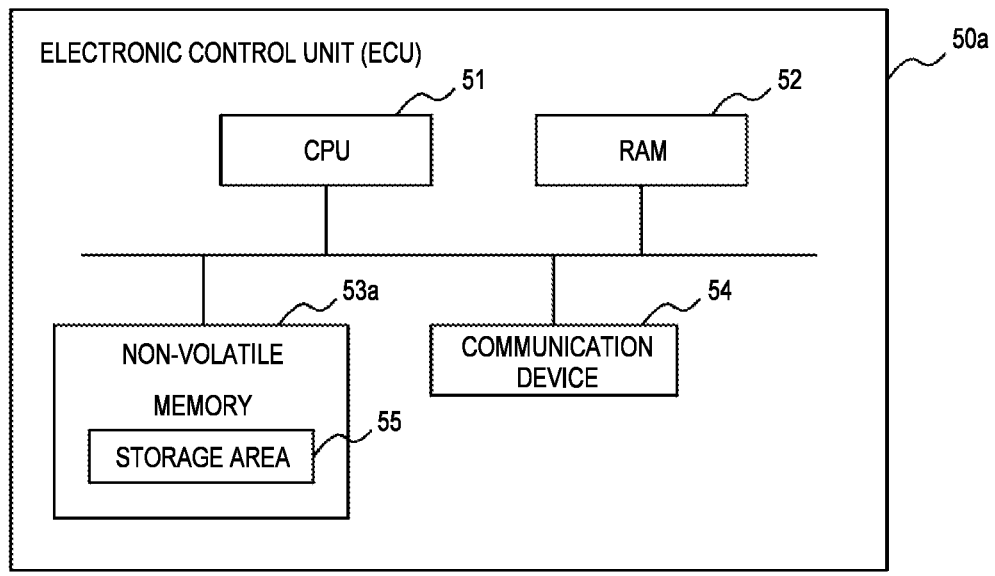
FIG. 6A is a block diagram illustrating an example of a schematic configuration of an ECU.

The ECU 50*a* illustrated in FIG. 6A includes a CPU 51, a RAM 52, a non-volatile memory 53*a*, and a communication device 54. The CPU 51 implements a function of the ECU 50*a* by executing a program read from the non-volatile memory 53*a* using the RAM 52 as a work area. The non-volatile memory 53*a* is a single-bank memory having one storage area 55 used for storing data, such as software. In the present embodiment, a memory type of the non-volatile memory 53*a*, which is a single-bank memory, may be stated as a "first type" to distinguish it from others. In addition to the software used for implementing the function of the ECU 50*a*, the storage area 55 may store version information, parameter data, a program for booting, a program for updating software, or the like. The communication device 54 is a device used for communicating with other ECUs 50*b* to 50*d* connected to the OTA master 30 or the in-vehicle network 90.

Figure 6B:
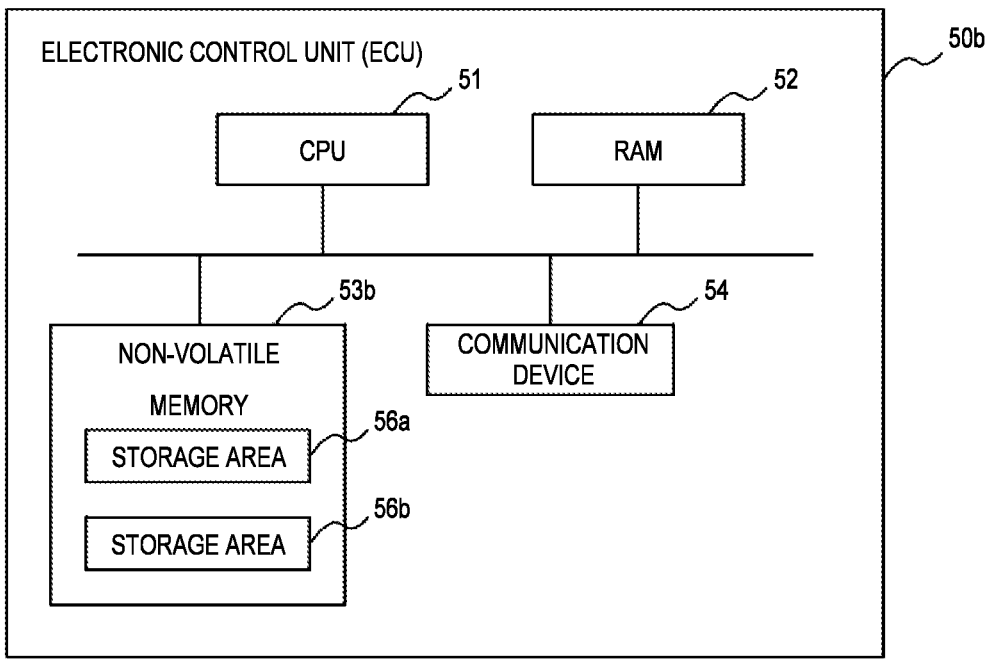
FIG. 6B is a block diagram illustrating another example of the schematic configuration of the ECU.

Similar to the ECU 50*a*, the ECU 50*b* illustrated in FIG. 6B includes the CPU 51, the RAM 52, a non-volatile memory 53*b*, and the communication device 54. However, the non-volatile memory 53*b* mounted on the ECU 50*b* is a dual-bank memory having two storage areas 56*a*, 56*b* used for storing data, such as software. In the present embodiment, a memory type of the non-volatile memory 53*b*, which is a dual-bank memory, may be stated as a "second type" to distinguish it from others. In addition to the software used for implementing a function of the ECU 50*b*, the storage areas 56*a*, 56*b* may store version information, parameter data, a program for booting, a program for updating software, or the like. The CPU 51 of the ECU 50*b* uses any one of the two storage areas 56*a*, 56*b* of the non-volatile memory 53*b* as the storage area (an active bank) to be read, and executes the software stored in the storage area to be read. On the other storage area (an inactive bank, written bank) that is not to be read, the update software (an updated version program) can be installed (written) based on the update data in a background while the program in the storage area (the active bank) to be read is being executed. In the software update processing, at the time of executing activation (making the update software active), the update software can be activated by switching the storage area from which the program is read by the CPU 51 of the ECU 50*b*.

As a specific example, it is assumed that the current software is stored in the storage area 56*a* of the non-volatile memory 53*b*, which is a dual-bank memory, and the update software is installed in the storage area 56*b*. For example, the ECU 50*b* can switch, upon receiving an instruction on activating the update software from the OTA master 30, the storage area (the active bank) to be read of the CPU 51 by switching a read start address of the CPU 51 from a head address of the storage area 56*a* to a head address of the storage area 56*b*, and can execute the update software installed in the storage area 56*b*. In the present disclosure, a configuration of the non-volatile memory, referred to as a "single-bank suspension memory" in which one storage area is pseudo-divided into two banks, and a program can be written on the one bank while the program stored on the other bank is being executed, is also classified as the second type memory.

Among the ECUs 50*a* to 50*d*, a plurality of ECUs that are required to operate cooperatively in order to implement one function, such as autonomous driving, exists. Then, the plurality of ECUs that are required to operate cooperatively may include both the ECU having the single-bank memory mounted thereon and the ECU having the dual-bank memory mounted thereon. For example, in a plurality of ECUs X and Y that are required to operate cooperatively in order to implement a function A, when a version of software x written on the ECU X and a version of software y written on the ECU Y are not a predetermined combination (for example, both are the latest versions) after the software update processing, a problem may occur. As an example of the problem, the function A may not be normally exhibited or cannot be executed. When the version of the software x written on the ECU X and the version of the software y written on the ECU Y are not the predetermined combination, a measure, such as re-executing the software update processing or returning the version of each of the software x and the software y to the version before the software update processing (so-called rollback), may be taken. However, the function A is limited during a time during which the measure is being taken. Here, in the software update processing of the present embodiment described below, it is possible to appropriately control the update sequence based on the type of the non-volatile memory of the ECU (the first type (the single-bank)/the second type (the dual-bank)), and reduce a time during which a function that requires cooperative operation is limited.

Figures 7, 8:
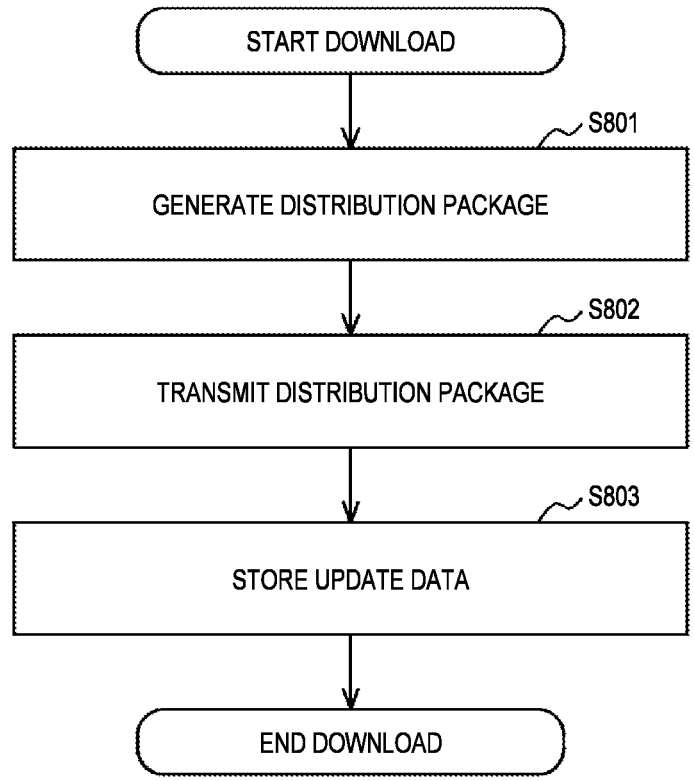
FIG. 7 is a diagram illustrating an example of type information.
FIG. 8 is a flowchart of download processing procedures executed by the center and the OTA master.

FIG. 7 illustrates an example of type information, which is information on a type of the non-volatile memory mounted on each of the ECUs 50*a* to 50*d*. In the type information exemplified in FIG. 7, an ECU_ID, which is a number used for identifying the ECU, is associated with the type (the first type (the single-bank)/the second type (the dual-bank)) of the non-volatile memory mounted on the ECU. The type information is stored in one or both of the storage unit 37 of the OTA master 30 and the storage unit 16 of the center 10, and managed. The type information may be generated in advance based on specifications of the ECUs 50a to 50d composing the in-vehicle network 90 and stored in the storage unit 37 at the time of manufacturing the vehicle and the like. Alternatively, the type information may be acquired by communication inside the in-vehicle network 90 from the target ECU at the time of executing the software update processing. Further, when the type information is managed by the center 10, the OTA master 30 may acquire the type information from the center 10 via the network 100.

The display device 70 is a human-machine interface (HMI) used for executing various displays, such as a display representing that the update data exists at the time of executing the software update processing of the ECUs 50a to 50d, a display of an approval request screen for requesting approval for the software update from a user or a manager of the vehicle, and a display of a result of the software update. As the display device 70, a display device of a car navigation system can be typically used, but the display device 70 is not particularly limited as long as it can display information required at the time of executing the software update processing. In addition to the display device 70, an ECU and the like may be further connected to the bus 60d illustrated in FIG. 1.

The communication module 80 is a unit having a function of controlling communication between the center 10 and the vehicle, and is a communication device used for connecting the in-vehicle network 90 to the center 10. The communication module 80 is connected to the center 10 by way of the network 100 in a wireless manner, and the OTA master 30 executes vehicle authentication, downloading of the update data, or the like. The communication module 80 may be included in the OTA master 30.

Overview of Software Update Processing

At, for example, the time of the power supply ON in the vehicle, the OTA master 30 transmits the update confirmation request of the software to the center 10. The update confirmation request includes a vehicle ID used for identifying the vehicle and vehicle configuration information, which is information on a state of an ECU (a system configuration), such as current versions of hardware and the software of the ECUs 50a to 50d connected to the in-vehicle network 90. The vehicle configuration information can be generated by acquiring identification numbers (ECU_ID) of the ECUs and identification numbers of the software versions (ECU_Software_ID) of the ECUs from the ECUs 50a to 50d connected to the in-vehicle network 90. The vehicle ID and the current versions of the pieces of the software of the ECUs 50a to 50d are used for determining whether the update data of the pieces of the software of the ECUs 50a to 50d exists by comparing them with the latest software version held by the center 10 for each vehicle ID. Further, as a response to the update confirmation request, the OTA master 30 receives a notification indicating whether the update data exists from the center 10. When the update data of the pieces of the software of the ECUs 50a to 50d exists, the OTA master 30 transmits, to the center 10, the download request for the distribution package and receives the distribution package transmitted from the center 10. In addition to the update data, the distribution package may contain verification data for verifying the authenticity of the update data, the number of pieces of update data, type information, the order of the installation, the order of the activation, various pieces of control information used at the time of executing the software update, or the like.

The OTA master 30 determines whether the update data of the pieces of the software of the ECUs 50a to 50d exists based on the response to the update confirmation request received from the center 10. Further, the OTA master 30 verifies the authenticity of the distribution package received from the center 10 and stored in the storage device 13. Further, the OTA master 30 transfers one or more pieces of update data downloaded in the distribution package to the target ECU and causes the target ECU to install the update data. After the completion of the installation, the OTA master 30 gives the target ECU an instruction on activation that makes the installed updated version software active.

Further, in approval request processing, the OTA master 30 causes an output device to output a notification indicating that the approval for the software update is required or a notification prompting an input indicating that the software update has been approved. As the output device, a display device 70 provided on the in-vehicle network 90, a voice output device (not shown) that outputs a notification by voice, or the like, can be used. For example, in the approval request processing, when the display device 70 is used as the output device, the OTA master 30 can cause the display device 70 to display an approval request screen used for requesting the approval for the software update from the user or the manager, and cause the display device 70 to display a notification prompting a specific input operation, such as pressing of an approval button in the case where the user or the manager approves the request. Alternatively, in the approval request processing, the OTA master 30 can cause the display device 70 to display text, an icon, or the like, notifying that the update data of the pieces of the software of the ECUs 50a to 50d exists, or cause the display device 70 to display restrictions and the like during the execution of the software update processing. Upon receiving the input indicating that the request has been approved from the user or the manager, the OTA master 30 executes control processing of the above-described installation and activation, and updates the software of the target ECU.

Here, when the non-volatile memory of the target ECU is the single-bank memory, in principle, the approval request processing for the software update is executed before the execution of the installation because the installation and the activation are consecutively executed. Further, when the non-volatile memory of the target ECU is the dual-bank memory, the approval request processing for the software update is executed at least after the execution of the installation and before the execution of the activation. When the non-volatile memory of the target ECU is the dual-bank memory, the approval request processing for the software update may be executed before the execution of the installation or omitted.

The software update processing is composed of a phase in which the OTA master 30 downloads the update data from the center 10 (a download phase), a phase in which the OTA master 30 transfers the downloaded update data to the target ECU, and installs the update software based on the update data in the storage area of the target ECU (an installation phase), and a phase in which the target ECU makes the installed update software active (an activation phase).

The download is processing in which the OTA master 30 receives, from the center 10, the update data for updating the software of the ECU transmitted in the distribution package and stores it in the storage unit 37. Regarding reception of the update data by downloading, the update data for the ECU having the second type non-volatile memory (the dual-bank memory) mounted thereon, which has a relatively low probability of update failure, may be prioritized and received, or the update data for the ECU having the first type non-volatile memory (the single-bank memory) mounted thereon and the update data for the ECU having the second type non-volatile memory (the dual-bank memory) mounted thereon may be received without prioritizing any of them. The download phase includes not only the execution of the download, but also control of a series of processes on the download, such as determining whether the download can be executed and verification of the update data.

The update data transmitted from the center 10 to the OTA master 30 may include any of the update software of the ECU (total data or difference data), the compressed data obtained by compressing the update software, and the divided data obtained by dividing the update software or the compressed data. Further, the update data may include the ECU_ID of the target ECU (or a serial number) and an ECU_Software_ID of the target ECU before the update. The update data is downloaded as the above-described distribution package, but the distribution package includes the update data for a single ECU or the plurality of ECUs.

The installation is processing in which the OTA master 30 writes, according to a determined order, the update software (the updated version program) on the non-volatile memory 53a and/or the non-volatile memory 53b of a plurality of target ECUs, based on the update data downloaded from the center 10. The installation phase includes not only the execution of the installation, but also control of a series of processes on the installation, such as determining whether the installation can be executed, transferring the update data, and verifying the update software.

When the update data includes the update software itself (the total data), in the installation phase, the OTA master 30 transfers the update data (the update software) to the target ECU. Further, when the update data includes the compressed data of the update software, difference data, or divided data, the OTA master 30 may transfer the update data to the target ECU and the target ECU may generate the update software from the update data, or the OTA master 30 may generate the update software from the update data and then transfer the update software to the target ECU. Here, the update software can be generated by decompressing the compressed data or assembling (integrating) the difference data or the divided data.

The update software can be installed by the target ECU based on a request for the installation from the OTA master 30. A specific target ECU that has received the update data may autonomously execute the installation without receiving an explicit instruction from the OTA master 30.

The activation is processing in which the target ECU makes (activates) the update software installed on the non-volatile memory 53a and/or the non-volatile memory 53b active. The activation phase includes not only the execution of the activation but also control of a series of processes on the activation, such as determining whether the activation can be executed, the approval request for the activation to the user or the manager of the vehicle, and verifying the execution results.

The update software can be activated by the target ECU based on a request for the activation from the OTA master 30. The specific target ECU that has received the update data may autonomously execute the activation after the completion of the installation without receiving an explicit instruction from the OTA master 30.

The software update processing can be executed continuously or in parallel to each of the target ECUs.

Further, the "software update processing" in the present specification includes not only processing for continuously executing all of the download, installation, and activation, but also processing for executing only a part of the download, installation, and activation.
Processing Next, specific examples of the software update processing executed in the network system according to the present embodiment will be described with further reference to FIGS. 8, 9, 10, and 11.
(1) Specific Example of Download FIG. 8 is a flowchart describing download processing procedures according to a specific example executed by the center 10 and the OTA master 30. The download exemplified in FIG. 8 is started when the center 10 receives a download request for the distribution package from the OTA master 30.

(Step S801) The center 10 generates a distribution package containing the update data and the like of the target ECU, of which software is to be updated. The update data for the target ECU is provided in advance from the OEM and the like. As the distribution package, the center 10 may generate a package in which the update data for the target ECU having the single-bank memory mounted thereon and the update data for the target ECU having the dual-bank memory mounted thereon are mixed, or may generate a package containing only the update data for the target ECU having the single-bank memory mounted thereon and a package containing only the update data for the target ECU having the dual-bank memory mounted thereon, respectively. When the center 10 manages the types of the non-volatile memories mounted on the ECUs 50a to 50d, respectively, the information on the memory types may be included in the distribution package. When the distribution package is generated, the process proceeds to step S802.

(Step S802) The center 10 transmits the generated distribution package to the OTA master 30. When the distribution package is transmitted, the process proceeds to step S803.

Figure 9:
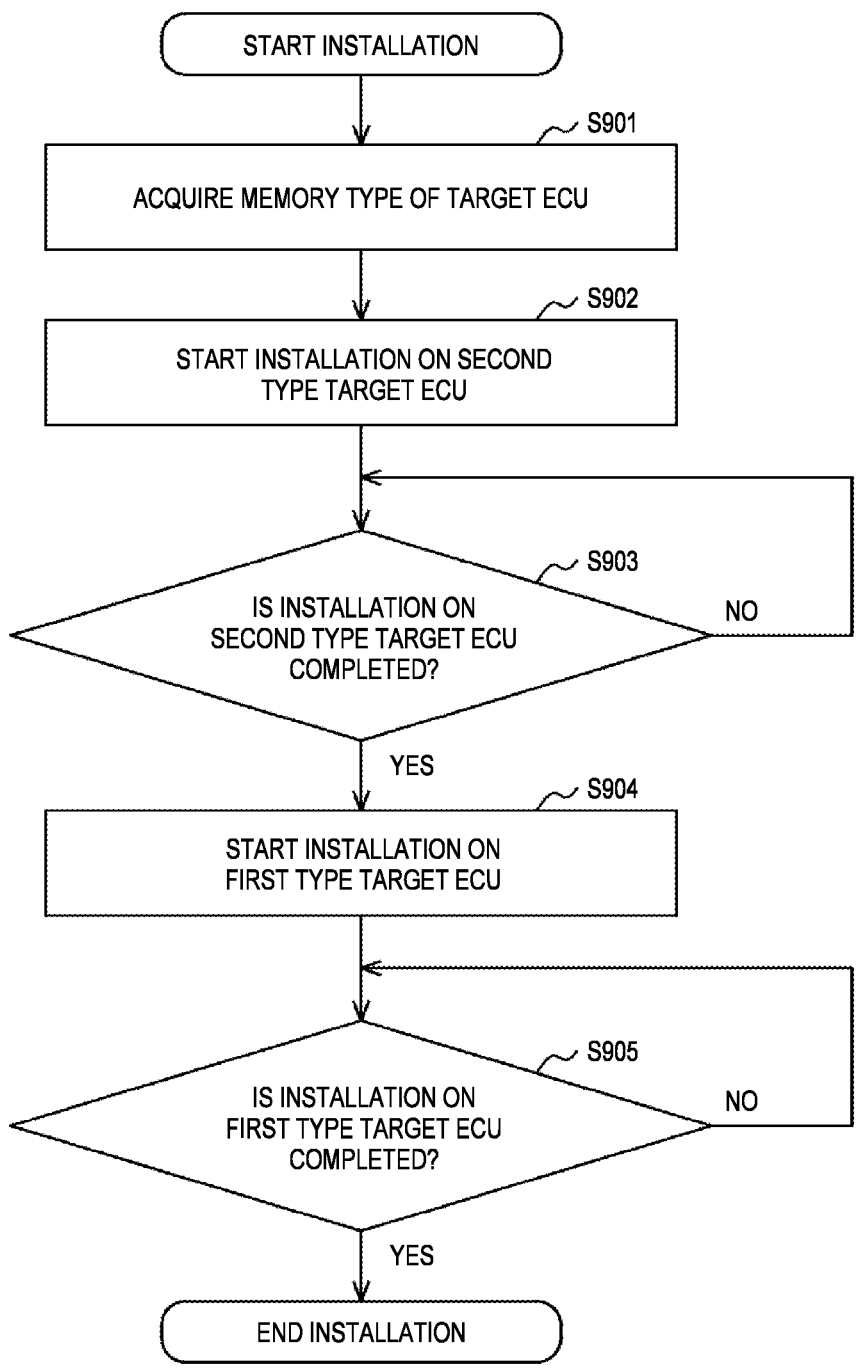
FIG. 9 is a flowchart of installation processing procedures according to a specific example 1 executed by the OTA master and a target ECU.

(Step S803) The OTA master 30 stores, in the storage unit 37, the update data (and the information on the memory types) and the like contained in the distribution package received from the center 10. As such, the download processing ends.
(2) Specific Example 1 of Installation FIG. 9 is a flowchart describing installation processing procedures according to a specific example 1 executed by the OTA master 30 and the target ECU. The specific example 1 of the installation describes an example where the installation of the update software on the target ECU having the first type non-volatile memory (the single-bank memory) mounted thereon (hereinafter, referred to as a "first type target ECU"), which requires stop control during the update is started at a timing at which the installation of the update software on the target ECU having the second type non-volatile memory (the dual-bank memory) mounted thereon (hereinafter, referred to as a second type target ECU), which does not require the stop control during the update is completed.

The installation processing of the specific example 1 exemplified in FIG. 9 is started after the download of the update data on the target ECUs is completed and when predetermined conditions (whether the installation can be executed, OK in terms of verifying the update data, and the like) are satisfied.

(Step S901) The OTA master 30 acquires the type (the first type/the second type) of the non-volatile memory mounted on the target ECU. This memory type can be acquired by referring to the type information (FIG. 7) stored in the storage unit 37 when the OTA master 30 manages the memory type, and by referring to the information of the memory type that is contained in the distribution package and transmitted when the center 10 manages the memory type. When the memory type of the target ECU is acquired, the process proceeds to step S902.

(Step S902) The OTA master 30 and the second type target ECU start the installation, which is processing for writing the update software on the storage area of the non-volatile memory of the second type target ECU, based on the update data. The installation is started all at once or in a predetermined order on all the second type target ECUs. When the installation on the second type target ECU is started, the process proceeds to step S903.

(Step S903) The OTA master 30 determines whether the installation of the update software on the second type target ECU is completed. The completion of the installation may be determined for all the second type target ECUs, or only for some second type target ECUs determined in advance. The OTA master 30 may determine the completion of the installation based on a completion notification from the second type target ECU or after a predetermined time has elapsed from the start of the installation. The predetermined time may be set, for example, to be equal to or longer than a maximum time needed for each installation. When it is determined that the installation of the update software on the second type target ECU is completed (step S903, yes), the process proceeds to step S904.

(Step S904) The OTA master 30 and the first type target ECU start the installation, which is the processing for writing the update software on the storage area of the non-volatile memory of the first type target ECU, based on the update data. The installation is started all at once or in a predetermined order on all the first type target ECUs. When the installation on the first type target ECU is started, the process proceeds to step S905.

(Step S905) The OTA master 30 determines whether the installation of the update software on the first type target ECU is completed. The completion of the installation is determined for all the first type target ECUs. The OTA master 30 may determine the completion of the installation based on a completion notification from the first type target ECU or after a predetermined time has elapsed from the start of the installation. The predetermined time may be set, for example, to be equal to or longer than a maximum time needed for each installation. When it is determined that the installation of the update software on the first type target ECU is completed (step S905, yes), the installation on all the target ECUs is completed, and the installation processing ends.

In the specific example 1 of the installation, the installation on the second type target ECU is started first, and then the installation on the first type target ECU is started at the timing at which it is determined that the installation on the second type target ECU is completed. By this process, it is possible to execute the installation on the second type target ECU that does not require the stop control during the update before the installation on the first type target ECU that requires the stop control during the update. Therefore, it is possible to reduce a communication load in the vehicle (the in-vehicle network 90) and shorten a time during which the control of the vehicle has to be stopped until the writing of all the pieces of the update software is completed.

(3) Specific Example 2 of Installation

Figure 10:
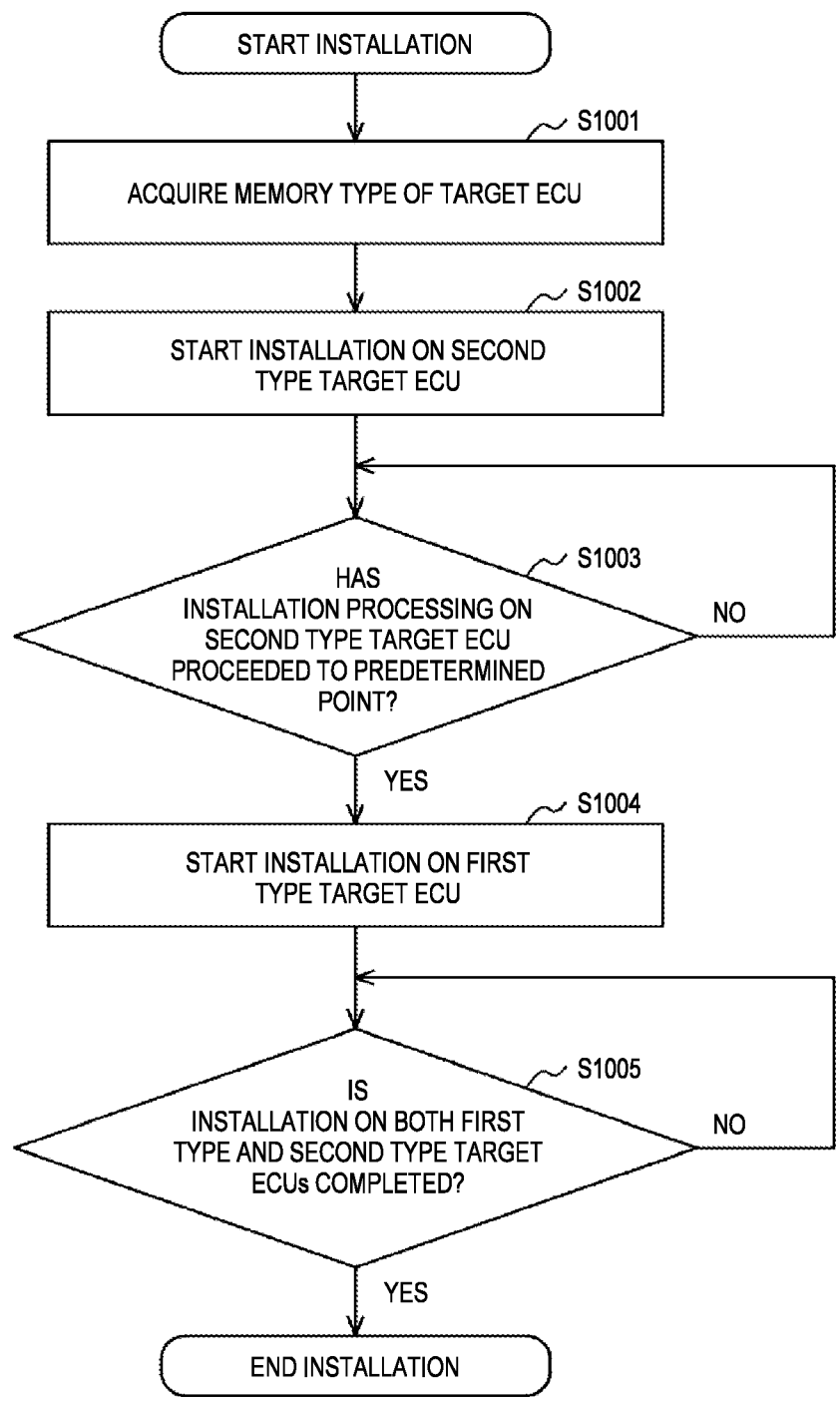
FIG. 10 is a flowchart of installation processing procedures according to a specific example 2 executed by the OTA master and the target ECU.

FIG. 10 is a flowchart describing the installation processing procedures according to a specific example 2 executed by the OTA master 30 and the target ECU. The specific example 2 of the installation is an example where the installation of the update software on the first type target ECU that requires the stop control during the update is started at a timing at which the installation of the update software on the second type target ECU that does not require stop control during the update has proceeded to a predetermined point.

The installation processing of the specific example 2 exemplified in FIG. 10 is started after the download of the update data on the target ECU is completed and when the predetermined conditions (whether the installation can be executed, OK in terms of verifying the update data, and the like) are satisfied.

(Step S1001) The OTA master 30 acquires the type (the first type/the second type) of the non-volatile memory mounted on the target ECU. This memory type can be acquired by referring to the type information (FIG. 7) stored in the storage unit 37 when the OTA master 30 manages the memory type, and by referring to the memory type information transmitted in the distribution package when the center 10 manages the memory type. When the memory type of the target ECU is acquired, the process proceeds to step S1002.

(Step S1002) The OTA master 30 and the second type target ECU start the installation, which is the processing for writing the update software on the storage area of the non-volatile memory of the second type target ECU, based on the update data. The installation is started all at once or in a predetermined order on all the second type target ECUs. When the installation on the second type target ECU is started, the process proceeds to step S1003.

(Step S1003) The OTA master 30 determines whether the processing for installing the update software on the second type target ECU has proceeded to the predetermined point (or has exceeded the predetermined point). The predetermined point may be set at any position (a processing stage) from the start of the installation to the completion of the installation. For example, the predetermined point may be set at various timings, such as a timing at which the writing processing has advanced to a point where a probability of successful installation is high, or a timing at which the writing processing has advanced to a point where recovery is possible without the re-installation even when the installation fails. Whether the installation has advanced to the predetermined point may be determined for all the second type target ECUs, or may be determined only for some second type target ECUs determined in advance. When it is determined that the processing for installing the update software on the second type target ECU has proceeded to the predetermined point (step S1003, yes), the process proceeds to step S1004.

(Step S1004) Based on the update data, the OTA master 30 and the first type target ECU start the installation, which is the processing for writing the update software on the storage area of the non-volatile memory of the first type target ECU. The installation is started all at once or in a predetermined order on all the first type target ECUs. When the installation on the first type target ECU is started, the process proceeds to step S1005.

(Step S1005) The OTA master 30 determines whether the installation of the update software on both the first type target ECUs and the installation of the update software on the second type target ECUs are completed. The completion of the installation is determined for all the first type target ECUs and all the second type target ECUs. The OTA master 30 may determine the completion of the installation based on completion notifications from the first type target ECUs and the second type target ECUs, respectively or after a predetermined time has elapsed from the start of the installation. The predetermined time may be set, for example, to be equal to or longer than a maximum time needed for each installation. When it is determined that the installation of the update software on both the first type target ECUs and the second type target ECUs is completed (step S1005, yes), the installation on all the target ECUs is completed, and the installation processing ends.

In the specific example 2 of the installation, the installation on the second type target ECU is started first, and then the installation on the first type target ECU is started at a timing at which it is determined that the installation on the second type target ECU has been advanced to the predetermined point. By this process, it is possible to execute the installation on the second type target ECU that does not require the stop control during the update before the installation on the first type target ECU that requires the stop control during the update. Therefore, it is possible to reduce the communication load in the vehicle (the in-vehicle network 90) and further shorten a time during which the control of the vehicle has to be stopped until the writing of all the update software is completed as compared with that in the specific example 1 of the installation.

In the specific examples 1 and 2, the examples are described where the OTA master 30 controls the orders of the installation and the activation of the update software on the first type target ECU and the second type target ECU, respectively by the determination of the OTA master 30 itself based on the control program stored in the storage unit 37. However, the OTA master 30 may control the orders of the installation and the activation of the update software on the first type target ECU and the second type target ECU, respectively by receiving a predetermined instruction from the center 10 (by acquiring information on an update sequence and the like).

(4) Specific Example of Activation

Figure 11:
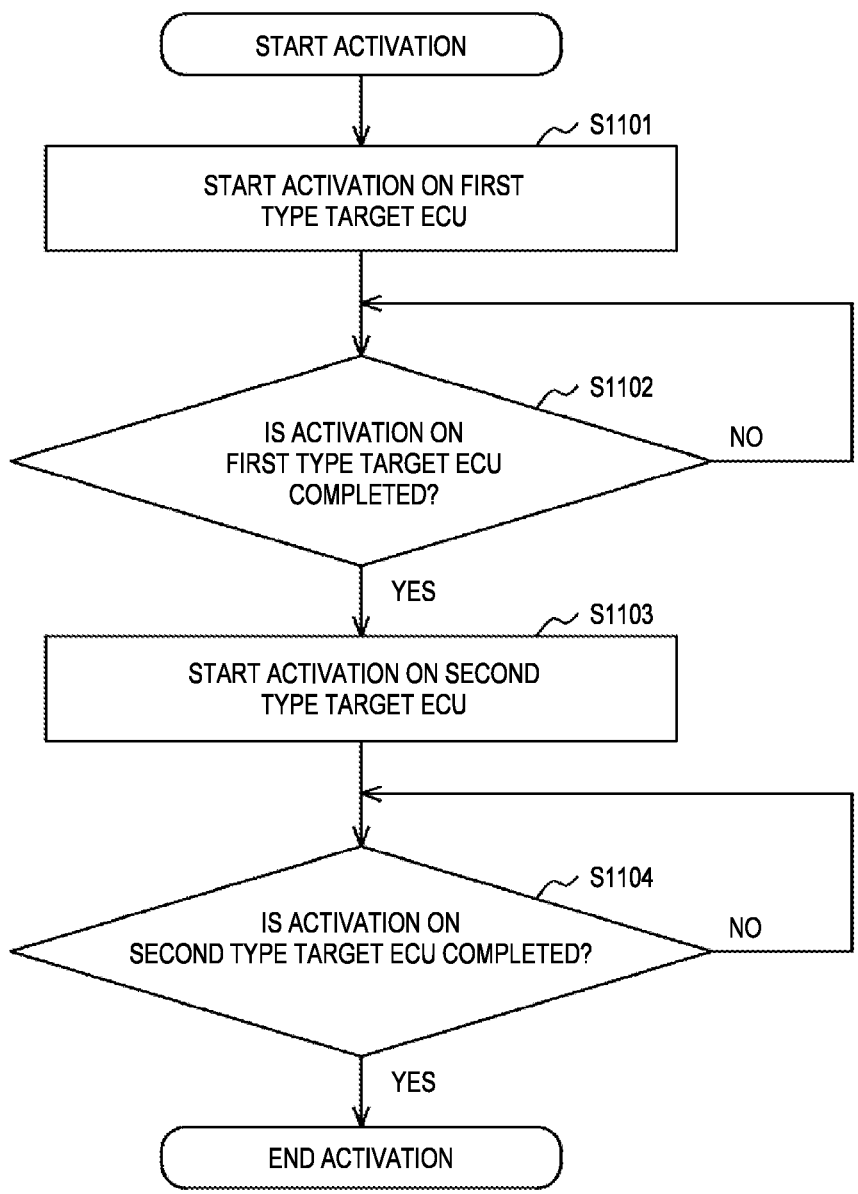
FIG. 11 is a flowchart of activation processing procedures executed by the OTA master the target electronic control unit.

FIG. 11 is a flowchart describing processing procedures according to a specific example of the activation executed by the OTA master 30 and the target ECU. The specific example of the activation is an example where the activation of the update software on the first type target ECU that requires the stop control during the update is executed, and then the activation of the update software on the second type target ECU that does not require the stop control during the update is executed.

The activation processing exemplified in FIG. 11 is started after the installation of the update software on each of the first type target ECU and the second type target ECU is completed and when the predetermined conditions (whether the activation can be executed, OK in terms of verifying the update data, and the like) are satisfied.

(Step S1101) The OTA master 30 and the first type target ECU start the activation, which is processing for making the update software written on the storage area of the non-volatile memory of the first type target ECU active. The activation is started all at once or in a predetermined order on all the first type target ECUs. When the activation of the update software on the first type target ECU is started, the process proceeds to step S1102.

(Step S1102) The OTA master 30 determines whether the activation of the update software on the first type target ECU is completed. The completion of the activation is determined for all the first type target ECUs. The OTA master 30 may determine the completion of the activation based on a completion notification from the first type target ECU or after a predetermined time has elapsed from the start of the activation. The predetermined time may be set, for example, to be equal to or longer than a maximum time needed for each activation. When it is determined that the activation of the update software on the first type target ECU is completed (step S1102, yes), the process proceeds to step S1103.

(Step S1103) The OTA master 30 and the second type target ECU start the activation, which is the processing for making the update software written on the storage area of the non-volatile memory of the second type target ECU active. The activation is started all at once or in a predetermined order on all the second type target ECUs. When the activation the update software of the second type target ECU is started, the process proceeds to step S1104.

(Step S1104) The OTA master 30 determines whether the activation of the update software on the second type target ECU is completed. The completion of the activation is determined for all the second type target ECUs. The OTA master 30 may determine the completion of the activation based on a completion notification from the second type target ECU or after a predetermined time has elapsed from the start of the activation. The predetermined time may be set, for example, to be equal to or longer than a maximum time needed for each activation. When it is determined that the activation of the update software on the second type target ECU is completed (step S1104, yes), the activation on all the target ECUs is completed, and the activation processing ends.

In the specific example of the activation, the activation of the update software on the first type target ECU started first, and the activation of the update software on the second type target ECU is started after it is determined that the activation of the update software on the first type target ECU is completed. By this process, it is possible to appropriately execute the software update processing of a system that includes, in the configuration, both the first type target ECU having the single-bank memory mounted thereon and the second type target ECU having the dual-bank memory mounted thereon.

Action and Advantageous Effect

As described above, according to the network system according to the embodiment of the present disclosure, the OTA master starts the writing of the update data on the ECU having the single-bank memory mounted thereon at a predetermined timing after starting the writing of the update data on the ECU having the dual-bank memory mounted thereon from among the update data for the ECU (the first type target ECU) having the single-bank memory mounted thereon and the update data for the ECU (the second type target ECU) having the dual-bank memory mounted thereon that are received from the center.

By this process, it is possible to start the installation of a newer version of the software on the ECU side having the single-bank memory mounted thereon after confirming that the installation of a newer version of the software on the ECU side having the dual-bank memory mounted thereon is completed (100% completed). Alternatively, it is possible to start the installation of the newer version of the software on the ECU side having the single-bank memory mounted thereon after confirming, regarding the installation of the newer version of the software on the ECU side having the dual-bank memory mounted thereon, for example, the fact that the writing processing has advanced to a point where a probability of successful installation is high (for example, 50% completed), or the fact that the writing processing has advanced to a point where recovery is possible without the re-installation even when the installation fails (for example, 70% completed).

For this reason, even when the preceding installation of the software on the ECU side having a dual-bank memory mounted thereon fails, since the installation of software on the ECU side having the single-bank memory mounted thereon has not yet started, it is possible to maintain a combination of old versions of the software on the ECU side having the dual-bank memory mounted thereon and the software on the ECU side having the single-bank memory mounted thereon, which are consistent with each other. Therefore, in a case where the ECU having the single-bank memory mounted thereon and the ECU having the dual-bank memory mounted thereon are required to operate cooperatively, such as when executing the autonomous driving function, even when the installation of the software on the ECU side having the dual-bank memory mounted thereon fails, it is possible to shorten the time during which the autonomous driving function is limited as compared with an update processing where software update procedures (a sequence order) between the ECU having the dual-bank memory mounted thereon and the ECU having the single-bank memory mounted thereon are not considered.

As above, one embodiment of the present disclosure has been described, but the present disclosure can be regarded not only as an OTA master, but also as an update method executed by the OTA master including a processor and a memory, an update program, a computer-readable non-transitory storage medium storing the update program, a center communicable with the OTA master, a system including the center and the OTA master, or a vehicle including the OTA master, or the like.

It is possible to use the technology of the present disclosure in a network system used for updating software of an ECU.

What is claimed is:

1. An over-the-air (OTA) master comprising one or more processors configured to:
control a software update for a plurality of electronic control units mounted on a vehicle, the electronic control units including a first electronic control unit on which a first type of non-volatile memory including one storage area is mounted and a second electronic control unit on which a second type of non-volatile memory including two storage areas is mounted;
request approval for the software update from a user by voice;
receive, from a center, first update data for the first electronic control unit and second update data for the second electronic control unit;
execute a first control to write the second update data on the second electronic control unit after completing reception of the first update data and the second update data and after the request has been approved from the user and cause, at a predetermined first timing, the second electronic control unit to activate the second update data; and
execute, at a predetermined second timing different from the predetermined first timing after completing the reception of the first update data and the second update data and after the request has been approved from the user, a second control to write the first update data on the first electronic control unit and cause the first electronic control unit to activate the first update data.

2. The OTA master according to claim 1, wherein the one or more processors are configured to:
write the first update data on the first electronic control unit and make the first update data written on the first electronic control unit active after writing the second update data on the second electronic control unit; and
make the second update data written on the second electronic control unit active after making the first update data written on the first electronic control unit active.

3. The OTA master according to claim 1, wherein the one or more processors are configured to acquire, from the center, type information indicating whether a non-volatile memory mounted on each of the electronic control units is the first type of non-volatile memory or the second type of non-volatile memory.

4. The OTA master according to claim 3, further comprising a storage device that stores the type information.

5. The OTA master according to claim 1, wherein an instruction of the predetermined first timing and the predetermined second timing is given from the center.

6. A vehicle comprising the OTA master according to claim 1.

7. A system comprising:
a center including one or more first processors; and
an over-the-air (OTA) master including one or more second processors, wherein
the one or more first processors are configured to
communicate with the one or more second processors configured to control a software update for a plurality of electronic control units mounted on a vehicle, the electronic control units including a first electronic control unit on which a first type of non-volatile memory including one storage area is mounted and a second electronic control unit on which a second type of non-volatile memory including two storage areas is mounted,
transmit, to the OTA master, first update data for the first electronic control unit and second update data for the second electronic control unit, and
give, to the OTA master, an instruction on a timing of writing the first update data on the first electronic control unit, and
the one or more second processors are configured to
request approval for the software update from a user by voice;
receive, from the center, the first update data and the second update data,
execute a first control to write the second update data on the second electronic control unit after completing reception of the first update data and the second update data and after the request has been approved from the user and cause, at a predetermined first timing, the second electronic control unit to activate the second update data, and
execute, at a predetermined second timing different from the predetermined first timing after completing the reception of the first update data and the second update data and after the request has been approved from the user, a second control to write the first update data on the first electronic control unit and cause the first electronic control unit to activate the first update data.

8. The system according to claim 7, wherein at least one of the center and the OTA master further includes a storage device that stores type information indicating whether a non-volatile memory mounted on each of the electronic control units is the first type of non-volatile memory or the second type of non-volatile memory.

9. An update method executed by an over-the-air (OTA) master configured to control a software update for a plurality of electronic control units mounted on a vehicle, the update method comprising:
- requesting approval for the software update from a user by voice;
- receiving, from a center, first update data for a first electronic control unit on which a first type of non-volatile memory including one storage area is mounted and second update data for a second electronic control unit on which a second type of non-volatile memory including two storage areas is mounted, the first electronic control unit and the second electronic control unit being included in the electronic control units;
- executing a first control for writing the second update data on the second electronic control unit after completing reception of the first update data and the second update data and after the request has been approved from the user and causing, at a predetermined first timing, the second electronic control unit to activate the second update data; and
- executing, at a predetermined second timing different from the predetermined first timing after completing the reception of the first update data and the second update data and after the request has been approved from the user, a second control for writing the first update data on the first electronic control unit and causing the first electronic control unit to activate the first update data.

10. A non-transitory storage medium storing instructions that are executable by a computer of an over-the-air (OTA) master configured to control a software update for a plurality of electronic control units mounted on a vehicle, and that cause the computer to execute the update method according to claim 9.

* * * * *